(12) United States Patent
Wade et al.

(10) Patent No.: US 8,741,986 B2
(45) Date of Patent: Jun. 3, 2014

(54) METHODS AND DEVICES FOR CONTINUOUS PRODUCTION OF POLYMERIC DISPERSIONS

(71) Applicant: Solutia Inc., St. Louis, MO (US)

(72) Inventors: Bruce Edward Wade, West Springfield, MA (US); Witold Szydlowski, Wilbraham, MA (US); Mike Yi Ren Chen, Unionville, CT (US); Stefaan Maurice Florquin, Biez (BE)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 14/013,316

(22) Filed: Aug. 29, 2013

(65) Prior Publication Data

US 2014/0011914 A1   Jan. 9, 2014

Related U.S. Application Data

(63) Continuation of application No. 11/274,534, filed on Nov. 15, 2005, now abandoned.

(51) Int. Cl.
*C08J 3/05* (2006.01)

(52) U.S. Cl.
USPC .......................................................... 523/336

(58) Field of Classification Search
USPC .................................................. 523/337, 336
See application file for complete search history.

(56) References Cited

U.S. PATENT DOCUMENTS

| 2,487,254 | A | * | 11/1949 | Mahoney | 427/155 |
| 2,532,223 | A | * | 11/1950 | Bromley, Jr. | 523/337 |
| 2,611,755 | A | * | 9/1952 | Bromley, Jr. | 523/336 |
| 3,234,161 | A | * | 2/1966 | Snelgrove et al. | 524/394 |
| 3,320,203 | A | | 5/1967 | Kellert | |
| 4,011,388 | A | * | 3/1977 | Murphy et al. | 526/320 |
| 5,470,150 | A | * | 11/1995 | Pardikes | 366/137 |
| 6,512,024 | B1 | | 1/2003 | Lundgard et al. | |
| 6,613,827 | B2 | | 9/2003 | Lundgard et al. | |
| 6,767,956 | B2 | | 7/2004 | Choudhery et al. | |

(Continued)

FOREIGN PATENT DOCUMENTS

| DE | 101 09 992 A1 | 9/2002 | |
| DE | 10109992 * | 9/2002 | C08J 3/05 |

(Continued)

OTHER PUBLICATIONS

Gibaldi, Joseph; MLA Handbook for Writers of Research Papers, Sixth Edition; 2003; p. 266; Modern Language Association of America; New York.

(Continued)

*Primary Examiner* — John Uselding
(74) *Attorney, Agent, or Firm* — James K. Leonard; Steven A. Owen; Dennis V. Carmen (57) ABSTRACT

The present invention is directed to the use of continuous extrusion devices to form high quality polymer dispersions. Screw extruder devices of the present invention inject water into a zone of high pressure, temperature, and shear to cause the rapid inversion of a weld in less than, for example, one minute, which compares very favorably with conventional batch methods, which can take, for example, two or more hours to complete an inversion. This rapid inversion—a surprising result given the extended time inversion requires in batch processes—allows for the continuous production of polymer dispersions.

15 Claims, 4 Drawing Sheets

(56) References Cited

U.S. PATENT DOCUMENTS

| | | |
|---|---|---|
| 8,232,336 B2 | 7/2012 | Moncla et al. |
| 2004/0198909 A1* | 10/2004 | Breitscheidel et al. ....... 525/165 |
| 2007/0243331 A1 | 10/2007 | Strandburg et al. |
| 2008/0009586 A1 | 1/2008 | VanSumeren et al. |

FOREIGN PATENT DOCUMENTS

| | | |
|---|---|---|
| WO | WO 00/71608 A1 | 11/2000 |
| WO | WO 00/71609 A1 | 11/2000 |
| WO | WO 02/28937 A2 | 4/2002 |
| WO | WO 02/070588 A1 | 9/2002 |
| WO | WO 2005/016998 A2 | 2/2005 |
| WO | WO 2007/087082 A2 | 8/2007 |

OTHER PUBLICATIONS

Holmberg, K. et al.; "Emulsions and Emulsifiers"; Surfactants and Polymers in Aqueous Solution; 2003; Chapter 21, pp. 461-471 2d Edition; John Wiley & Sons, Ltd.

Morrison, I.D. and Ross, S.; "Emulsions"; Colloidal Dispersions—Suspensions, Emulsions, and Foams; 2002; Chapter 22, pp, 420-455; Wiley-Interscience.

Wade, Bruce; "Vinyl Acetal Polymers"; Encyclopedia of Polymer Science and Technology; Aug. 2003; vol. 8; pp. 381-399; John Wiley & Sons, Inc.

"Poly(vinyl butyral)," ChemBlink Online Database of Chemicals from Around the World, http://www.chemblink.com/products/63148-65-2.htm; printed Sep. 6, 2013, 2 pages.

The Chicago Manual of Style, 15th Edition; 2003; pp. 218 and 262; University of Chicago Press; Chicago, Illinois.

Notification of Transmittal of the International Search Report and the Written Opinion of the International Searching Authority, or the Declaration date of mailing Sep. 3, 2007 received in International Application No. PCT/US2006/060580.

Notification Concerning Transmittal of International Preliminary Report on Patentability date of mailing May 29, 2008 received in International Application No. PCT/US2006/060580.

Office Action dated Nov. 18, 2008 received in European Patent Application No. 06 850 389.5.

\* cited by examiner

METHODS AND DEVICES FOR CONTINUOUS PRODUCTION OF POLYMERIC DISPERSIONS

CROSS-REFERENCE TO RELATED APPLICATION

This application is a continuation from U.S. Non-Provisional application Ser. No. 11/274,534 filed Nov. 15, 2005, the disclosure of which is incorporated herein by reference in its entirety

FIELD OF THE INVENTION

The present invention is in the field of polymer dispersions, and, in particular, the present invention is in the field of polymer dispersions that can be applied to the surfaces of items to provide a physical barrier. In particular, dispersions produced by the methods of the present invention can be used in the formation of films or for impregnating and coating fibrous materials, and can also be mixed with inorganic additives such as calcium carbonate or metal oxides for forming barrier coatings that can be used for paper and paperboard products.

BACKGROUND

Polymer dispersions, which can be polymer emulsions or polymer suspensions without a plasticizer, have conventionally been used for a wide array of applications, including, for example, as a protective, temporary film coating, as paint masking, as spray booth coating, for equipment protection, and for surface decontamination.

One conventional method for producing an emulsion of plasticized polymer-in-water involves mixing polymer, plasticizer, and surfactant to form a weld. The weld is then mixed while sufficient water is added to cause an inversion to a plasticized polymer-in-water emulsion or abbreviated oil-in-water emulsion (see, for example, U.S. Pat. No. 2,487,254). The oil-in-water emulsion can then, for example, be sprayed on a surface for which protection is desired, thereby forming a layer. After formation of the layer, water will readily evaporate or be absorbed into an adjacent fibrous layer, resulting in a continuous layer of polymer on the surface. This method, however, requires the input of a significant amount of energy, and further requires the use of relatively heavy duty equipment.

An improved version of the above-described method incorporates excess water in the initial mixing step, which results in plasticized polymer-in-water. Sufficient water is then slowly evaporated while mixing and heating, resulting in an inversion to water-in-oil plasticized polymer. Finally, water is added back, with mixing and heating, resulting in a reversion to a final oil plasticized polymer-in-water or an abbreviated oil-in-water emulsion (see, for example, U.S. Pat. No. 2,532,223). This method uses relatively low amounts of energy.

Other conventionally used methods of producing polymer dispersions include using an alkyl aryl alkali metal sulfonate agent and only a single inversion (see, for example, U.S. Pat. No. 2,611,755), as well as using a single inversion in combination with little or no plasticizer (see, for example, U.S. Pat. No. 3,234,161).

Various other methods of mixing and compounding polymeric materials have been reported, including methods that use screw extruders to mix polymeric compounds lacking water (see, for example, WO00/71608, U.S. Pat. No. 6,512, 024, and WO00/71609) and screw extruders that mix polyol-based compounds (see, for example, U.S. Pat. No. 6,613,827 and WO02/28937).

Conventional methods, however, are time-consuming and energy intensive. What are needed in the art are methods and devices for rapid and economical production of polymer dispersions.

SUMMARY OF THE INVENTION

The present invention is directed to the use of continuous extrusion devices to form high quality polymer dispersions. Screw extruder devices of the present invention inject water into a zone of high pressure, temperature, and shear to cause the rapid inversion of a weld in less than, for example, one minute, which compares very favorably with conventional batch methods, which can take, for example, two or more hours to complete an inversion. This rapid inversion—a surprising result given the extended time inversion requires in batch processes—allows for the continuous production of polymer dispersions.

DETAILED DESCRIPTION

The present invention is directed to devices and methods that efficiently produce polymer dispersions in a continuous process. As used herein, a "polymer emulsion" refers to a polymer that has been plasticized with an oil, for example castor oil, and then emulsified in water. As used herein, a "polymer suspension" refers to a polymer, which has not been plasticized with an oil, that has been dispersed in water. Polymer dispersions include both polymer emulsions and polymer suspensions.

Devices of the present invention include screw extruders that are capable of producing the appropriate temperature, pressure, and shear for optimal mixing of materials, such as single screw and multiple screw extruders. In preferred embodiments, a twin screw extruder is used. Twin screw extruders are well known in the art and can be readily configured in a virtually limitless number of permutations to achieve many desired effects.

Screw extruders of the present invention are configured, in various embodiments, to allow for the introduction of several separate components that are mixed in a first zone. In various embodiments, thermoplastic polymer resin, surfactant, and initial water are introduced into the screw extruder and are mixed in a first zone. In various embodiments, plasticizer is also added. In yet further embodiments, other agents and components can be added prior to mixing in the first zone.

As used herein, a "zone" within an extruder is a section of the length of the extruder that is configured to perform a discrete function. In the case of the first zone just described, the function is to thoroughly mix the resin, surfactant, plasticizer if included, and initial water to form a weld. A zone can have one or more subzones, for example, in which a portion of the function of the zone is performed. For example, the first zone can have two or more subzones in which one or more of the components are added and/or mixed to achieve the desired result.

As used herein, a "weld" is the homogeneous dispersion of water-in-polymer or water-in-oil plasticized polymer formed from the thorough mixing of the starting components.

Components can be introduced into the extruder by any suitable, conventional method. For example, solid materials such as polymer resins can be fed into the extruder through a port provided with a loss-in-weight feeder, and liquids can be gravity fed or injected into the extruder. It is usually desired to convey polymer in first and then to introduce the plasticizer (if any), surfactant, and some initial water. These initial ingredients can optionally be introduced, for example, using gravity feed or under pressure. The plasticizer, surfactant, and initial water may be combined as an emulsion to inject as a single feed.

As will be described in more detail below, water injection points located in the weld inversion zone are preferably configured to inject water at high pressure, and, specifically, at a pressure higher than the pressure of the zone into which the water is being injected. As used herein "adding water" includes any conventional method of introducing water into a screw extruder, and in preferred embodiments, "adding water" means injecting water at a high pressure greater than that of the zone pressure into which the water is added.

In various embodiments of the present invention, the weld inversion zone includes one, two, or more subzones comprising one or more intermediate water injection points. These intermediate water injection points allow for the gradual mixing of water into the weld prior to inversion, which provides for a more homogeneous sand finer dispersion of water droplets prior to the inversion point. Pressures and temperatures for these intermediate water injection subzones can be, for example, the same as for elsewhere within the weld inversion zone.

In various embodiments, a segmented, co-rotating, closely intermeshed and self-wiping twin screw extruder is used for the process of the present invention. In various embodiments, two and three lobe designs are used. A 50 L/D ((screw length)/(nominal screw diameter)) or longer process section, for example, can be used for preparation of a weld and subsequent formation of a polymer dispersion. A screw extruder of any suitable aspect ratio ((screw outer diameter)/(screw inner diameter)) can be used.

In other embodiments, a single screw or counter-rotating extruder is used with the methods of the present invention.

In various embodiments, for example, the first zone can operate preferably at low temperatures of up to 100° C. and pressures of $2 \times 10^6$ Pascal to $4 \times 10^6$ Pascal (300-600 pounds per square inch). The use of temperatures lower than 100° C. in various embodiments of the present invention reduce or eliminate the formation of steam within the extruder, which results in more complete and efficient processing. Higher temperature, of course, can be used in alternative embodiments.

Higher temperatures and pressures can be used with a thermally stable thermoplastic polymer to optimize mixing and weld formation. Also, typically a higher temperature can be used for polymers lacking a plasticizer. Pressure is kept sufficiently high so as to suppress or prevent formation of bubbles of steam. In examples in which a plasticizer is used, comparatively less shearing force is generally required at the same temperature. Shearing rate can be set at, for example, an average 200 $s^{-1}$ or higher. The components are generally moved into and through the first zone in the minimum amount of time required to thoroughly mix the components and form the weld, for example less than 45, 35, or 30 seconds.

After formation of the weld in the first zone, the weld material is moved to a second zone. The second zone can be adjacent the first zone, or can be some distance downstream in the extruder. In various embodiments it is preferred to provide some distance between the first and second zone, for example with conveying screw elements, which allows for the equilibration of weld temperature.

The second zone has means for introducing water to promote full inversion, which will generally be a port through which the water is injected at relatively high pressure, for example, at a pressure greater than the pressure in the second zone. Injection pressures can be, for example, $2.67 \times 10^6$ Pascal to $3.33 \times 10^6$ Pascal or $2.67 \times 10^6$ Pascal to $4 \times 10^6$ Pascal. The second zone is configured so as to create a high temperature, high pressure zone in which the weld will undergo an inversion and then be quickly dispersed or emulsified. In various embodiments, the second zone is maintained at temperatures of, for example, 70° C. to 90° C., 80° C. to 90° C. or up to 100° C. and pressures of $2 \times 10^6$ Pascal to $4 \times 10^6$ Pascal. Conditions can be chosen, for example, to allow for the most rapid, complete inversion possible. Components can be within the second zone for any suitable duration, for example less than 45 seconds, less than 35 seconds, or less than 30 seconds. Water injected into the second zone is preferably at a temperature approximating the zone temperature, thereby preventing quenching of the weld.

Further zones can be added downstream in the extruder, as desired, to provide a convenient method to introduce more water for dilution of the polymer dispersion, or to introduce agents or other components into the final composition.

The product of the screw extrusion process just described is a polymer dispersion that can be used for many purposes, as described elsewhere herein. The devices and processes of the present invention can be used to produce polymer dispersions having extremely fine particle size, which is generally considered desirable. For example, the methods of the present invention can result in polymer dispersions having most particle diameters less than 10 microns, 7.5 microns, or 5 microns, and with most particle diameters between 0.25 and 1.5 microns.

Compositions of the present invention include thermoplastic polymer compositions that can conventionally be formed into a weld and then formed into a dispersion in water or another liquid.

The polymeric component of dispersions of the present invention can comprise any conventional thermoplastic polymer, and in various embodiments, the polymer comprises a poly(vinyl acetal), such as poly(vinyl butyral), or a polyurethane.

Suitable poly(vinyl acetal)s for the practice of the present invention can be obtained, for example and without limitation, by reacting poly(vinyl alcohol) or a partially hydrolyzed polyvinyl ester with an aldehyde. Other poly(vinyl acetal)s, such as the reaction products of hydrolyzed poly(vinyl ester)s with formaldehyde, acetaldehyde, propionaldehyde, and benzaldehyde, also may be used.

Among the poly(vinyl acetal)s, poly(vinyl butyral) is particularly useful. The poly(vinyl butyral)s that are used in accordance with the invention may vary substantially in their composition. Thus, in some embodiments, poly(vinyl butyral)s may be used that have up to 30% hydroxyl groups by weight, calculated as poly(vinyl alcohol), up to 30% ester groups by weight, calculated as polyvinyl ester, and the balance substantially butyraldehyde acetal. In various embodiments, poly(vinyl butyral) containing more than 9% hydroxyl groups by weight, but not more than 25% hydroxyl groups, calculated as poly(vinyl alcohol) can be used.

According to further embodiments of the present invention, the poly(vinyl butyral) contains 10-20% hydroxyl groups by weight, calculated as poly(vinyl alcohol), less than 5% acetate groups by weight, calculated as poly(vinyl acetate), with the balance substantially butyraldehyde acetal.

The polyvinyl esters from which the poly(vinyl butyral)s are made may have widely varying degrees of polymerization as evidenced by the viscosities of solutions thereof. For example, poly(vinyl acetate)s that are used as a starting material in the sequential processes of hydrolysis and acetalization to manufacture poly(vinyl butyral) may be used. Other polyvinyl esters may vary correspondingly. In various embodiments, the resultant polymer used in the dispersion manufacture process has a weight average molecular weight of at least 40,000 Daltons to produce films with desirable mechanical properties.

The ester groups in the poly(vinyl butyral)s are usually acetate groups, but the acetate groups may be wholly or partially replaced by other ester groups such as formate, propionate, butyrate, benzoate, and the like.

Polymeric resins can be incorporated into polymer dispersions in any suitable amount, with the end product having a percent solids concentration of, for example, from 40% to 70% solids or 40% to 60% solids on a weight per weight basis, with "solids" being defined as the total weight of polymer, plasticizer, surfactant, and other agents. The proportion of the individual components within the total solids are given in parts per one hundred parts resin (phr).

Various poly(vinyl butyral) resins are commercially available from Solutia, Incorporated (St. Louis, Mo.), as Butvar®.

Any plasticizer suitable for use with a chosen thermoplastic polymer of the present invention can be used. Useful plasticizers include, but are not limited to, triethylene glycol di-2-ethylhexanoate, butyl ricinoleate, castor oil, dibutoxy ethyl phthalate, diethyl phthalate, dibutyl sebacate, dibutyl phthalate, triethylene glycol dihexoate, trioctyl phosphate, triethyl glycol ester of coconut oil fatty acids, phenyl ethers of polyethylene oxide rosin derivatives, oil modified sebacic alkyd resins, tricresyl phosphate, and the like. Mixes of these and/or other plasticizers may also be employed.

Plasticizers can be incorporated in any suitable amount, including some embodiments in which no plasticizer is used, and these amounts include, for example, up to 80 phr, up to 50 phr, up to 30 phr, or from 5-80 or 10-40 phr plasticizer.

Any suitable surfactant may also be employed, for example, but not limited to, reaction products of strong bases and soap forming organic acids in general, sodium oleate, salts of such bases as the alkali metals, for example sodium hydroxide or potassium hydroxide, ammonium hydroxide or quaternary ammonium bases, for example, triphenyl methyl ammonium hydroxide, tetraethyl ammonium hydroxide, and the like, triethanolamine, morpholine, and the like, made with such organic acids as stearic acid, oleic acid, ricinoleic acid, palmitic acid, lauric acid, dodecyl benzene sulfonic acid, abietic acid, and the like, as well as, generally, alkyl aryl alkali metal sulfonates. A surfactant that is a combination of an acid and a base may be reacted in-situ in the first zone of the extruder or prior to injection. In various embodiments, a surfactant mixture is produced in-situ from the following combination of organic acids: 73% oleic acid, 8% linoleic acid, 6% palmitoleic acid, 3% myristoleic acid, 1% linolenic acid, and 9% C14-C17 saturated carboxylic acids.

In various embodiments, the acid portion is an organic acid having an aliphatic chain of at least 10 carbon atoms, for example, 10 to 20 carbon atoms, as those given above. Other suitable surfactants can be selected from the general class of water-dispersible surfactants which are compatible with a poly(vinyl acetal) resin and plasticizer, if any, typical examples of which are aryl alkyl sulfonates, tertiary amines, and ethylene oxide fatty acid condensates.

A surfactant can be incorporated in any suitable amount, including, for example, 0.5 to 30 phr, 0.5 to 20 phr, or 0.5 to 10 phr, depending on the surfactant (or co-surfactant if any) used and the other components of the dispersion.

Water can be incorporated at the beginning of the process and prior to introduction into the first zone in a relatively small amount that is sufficient to form a water in resin or water in oil composition. In various embodiments, the amount of initial water for weld formation is between 5% and 25% of the solids weight. In the second zone, where additional water is introduced to induce inversion to a polymer dispersion, water is introduced in an amount at least sufficient to allow the inversion to occur. Further water can, of course be added at that point. Finally, any further amount of water, as desired, can be added prior to final extrusion to dilute the dispersion. Final inversion occurs at a solids content of, for example, from 65%-95% or from 70%-90%. In various embodiments the minimum water for inversion is used so as to minimize the energy requirement per unit mass of weld and minimum dispersion particle diameters. Dilution of the aqueous phase is followed-up in a subsequent zone or outside of the extruder. In various embodiments, aqueous dispersions have a solids concentration in the ranges given above. In various embodiments, a final solids concentration on the lower end of the range—for example about 40%—is preferred to maximize shipping economy. Further dilution can generally be performed at the point of application of the polymer dispersion.

Other agents and additives can optionally be included at any suitable stage of processing, including, but not limited to, fillers, modifying agents, starches, clays, natural gums, synthetic thickeners, and the like.

Devices and methods of the present invention provide several significant advantages over conventional batch process methods and devices. The present invention allows for the continuous and relatively extremely rapid production of a polymer dispersion. Whereas prior art methods could require two or more hours of high energy mixing to provoke inversion of a weld, the present invention provides devices and methods that allow the inversion to occur within a minute, thereby significantly reducing both production time and energy requirements. A further advantage of the invention, as is evidenced by the examples, is the desirably small and narrow distribution of particle sizes, which allows for the formation of improved films and reduces the amount of filtering required to produce an end product.

The present invention includes extruder devices, and particularly twin screw extruder devices, that are configured as disclosed elsewhere herein to produce a polymer dispersion, which can be a suspension or an emulsion, under the specified conditions.

The present invention includes methods of producing a polymer dispersion, comprising using any of the devices of the present invention to form a polymer dispersion.

The present invention also includes films and other coatings and applications of polymer dispersions produced by the methods of the present invention and/or devices of the present invention.

EXAMPLE 1

A Berstorff ZE-25A twin screw extruder with aspect ratio of 1.45 is set up to provide a weld formation zone and a weld inversion zone. The weld formation zone is configured to accept polymer resin, plasticizer, surfactant, and a portion of the final water weight. The weld inversion zone is configured with two water injection ports. The zone temperatures for the twin screw extruder are 75° C. to 95° C. The water for injection points is preheated to 65° C. to 75° C.

The following components are added to the extruder and passed through the first zone in less than about 10 seconds: 101.3 grams per minute Butvar® B-72 Resin, 51.0 grams per minute castor oil, 20.6 grams per minute Petronate L surfactant (Crompton Corp., Middlebury, Conn.), and 20.4 grams per minute initial water. A further 52.9 grams per minute (105.8 total) of water are introduced under pressure at each water injection point in the weld inversion zone.

The weld is then further dispersed by hand into about 80% water after discharge from the extruder.

The resulting polymer dispersion has the following particle characteristics, as measured with a Horiba LA-910 particle size analyzer:

| Particle Diameter in Microns for Cumulative Length Percent | | | Particle Diameter in Microns for Cumulative Volume Percent | | |
| --- | --- | --- | --- | --- | --- |
| 10% | 50% | 90% | 10% | 50% | 90% |
| 0.199 | 0.316 | 0.463 | 0.266 | 0.405 | 1.461 |

Figure 1:
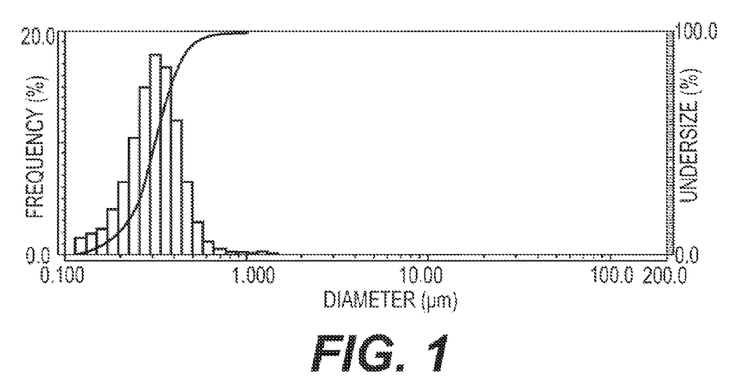
FIG. 1 is a graph showing a particle size distribution for a polymer dispersion.
Figure 2:
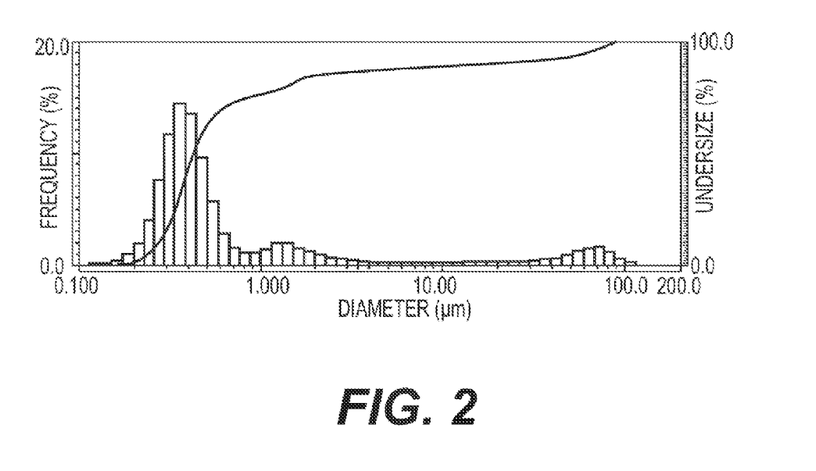
FIG. 2 is a graph showing a particle size distribution for a polymer dispersion.

These results are shown graphically in FIGS. 1 (cumulative length) and 2 (cumulative volume).

Moisture content of the weld product prior to hand dispersing is measured with a Mettler Toledo HR 73 Halogen Moisture Analyzer to be 27.31 percent.

After dispersing by hand, the polymer dispersion is sieved through a Number 80 sieve with an opening of 180 microns, and a Mettler Toledo HR 73 Halogen Moisture Analyzer is used to measure the solids contents of rejects and accepts according to the following table:

| Wet Weight (weight percent) | | Solids Content (weight percent) | |
| --- | --- | --- | --- |
| Accepts | Rejects | Accepts | Rejects |
| 98.64 | 1.36 | 2.53 | Not Measured |

EXAMPLE 2

A Berstorff ZE-25A twin screw extruder is set up to provide a weld formation zone and a weld inversion zone. The weld formation zone is configured to accept polymer resin, plasticizer, surfactant, and a portion of the final water weight. The weld inversion zone is configured with two water injection ports. The zone temperatures for the twin screw extruder are 75° C. to 95° C. The water for injection points is preheated to 65° C. to 75° C.

The following components are added to the extruder, passed through the first zone in less than about 10 seconds, through the second zone, and then extruded as a dispersed polymer, which is sampled at two time points (A and B):

The following components are added to the extruder and passed through the first zone in less than about 10 seconds: 101.3 grams per minute Butvar® B-72 Resin, 51.0 grams per minute castor oil, 20.6 grams per minute Petronate L surfactant (Crompton Corp., Middlebury, Conn.), and 20.4 grams per minute initial water. A further 94.5 grams per minute (189.0 total) of water are introduced under pressure at each water injection point in the weld inversion zone.

The resulting polymer first sample dispersion at time point A has the following particle characteristics, as measured with a Horiba LA-910 particle size analyzer:

| Particle Diameter in Microns for Cumulative Length Percent | | | Particle Diameter in Microns for Cumulative Volume Percent | | |
| --- | --- | --- | --- | --- | --- |
| 10% | 50% | 90% | 10% | 50% | 90% |
| 0.183 | 0.286 | 0.422 | 0.268 | 1.202 | 14.723 |

Figure 3:
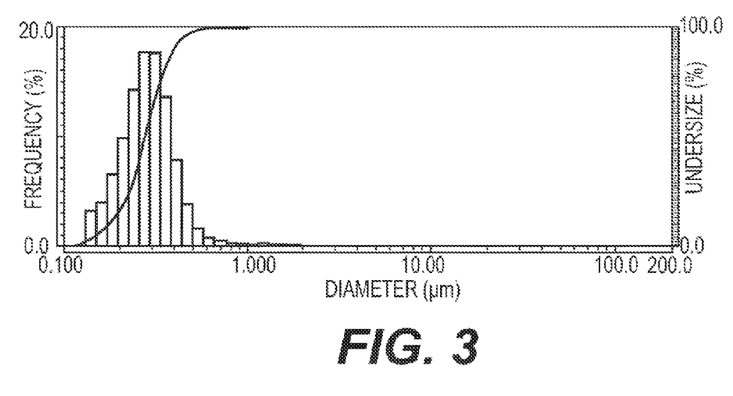
FIG. 3 is a graph showing a particle size distribution for a polymer dispersion.
Figure 4:
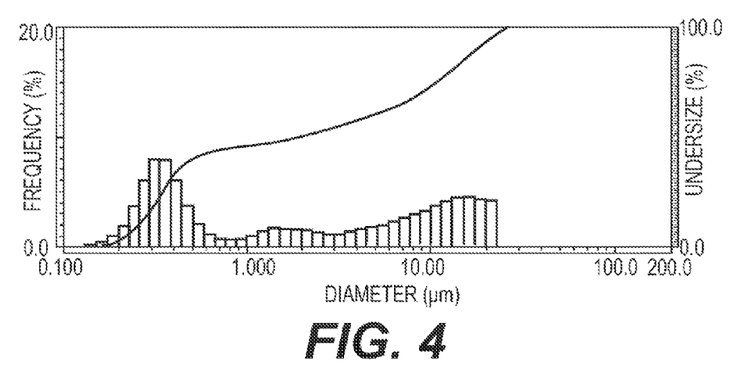
FIG. 4 is a graph showing a particle size distribution for a polymer dispersion.

These results are shown graphically in FIGS. 3 (cumulative length) and 4 (cumulative volume).

The polymer dispersion samples from time points A and B (initial and after more time) are sieved through a Number 80 sieve with an opening of 180 microns, and a Mettler Toledo HR 73 Halogen Moisture Analyzer is used to measure the solids contents of rejects and accepts according to the following table:

| Time Point | Wet Weight (weight percent) | | Solids Content (weight percent) | |
| --- | --- | --- | --- | --- |
| | Accepts | Rejects | Accepts | Rejects |
| A | 87.32 | 12.68 | 11.85 | Not Measured |
| B | 90.98 | 9.02 | 34.44 | 30.81 |

A sieved sample of time point B is hand poured into a steel dish, which is placed in a level position. After evaporation of the water, the cast film formed is examined and determined to be of a quality approximating that of films formed from commercially available dispersions.

EXAMPLE 3

Comparative

Commercially available poly(vinyl butyral) dispersion RS-261 from Solutia, Incorporated is analyzed and is determined to have the following particle characteristics, as measured with a Horiba LA-910 particle size analyzer:

| Particle Diameter in Microns for Cumulative Length Percent | | | Particle Diameter in Microns for Cumulative Volume Percent | | |
| --- | --- | --- | --- | --- | --- |
| 10% | 50% | 90% | 10% | 50% | 90% |
| 0.186 | 0.317 | 0.553 | 0.314 | 1.314 | 5.486 |

Figure 5:
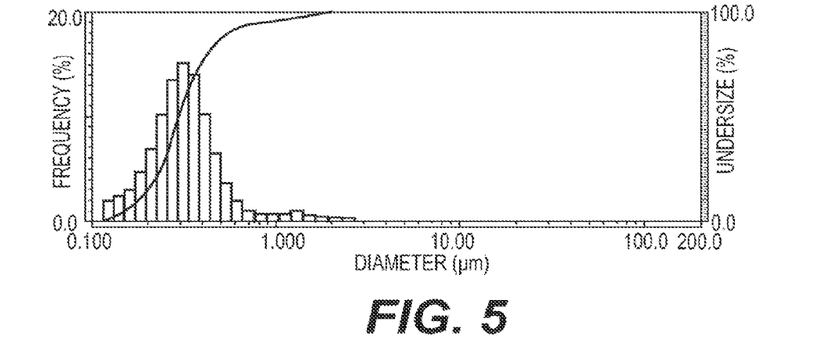
FIG. 5 is a graph showing a particle size distribution for a polymer dispersion.
Figure 6:
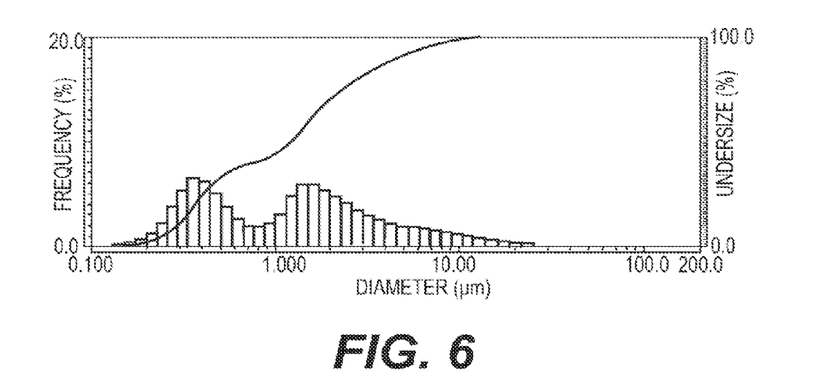
FIG. 6 is a graph showing a particle size distribution for a polymer dispersion.

These results are shown graphically in FIGS. 5 (cumulative length) and 6 (cumulative volume).

EXAMPLE 4

A Berstorff ZE-40A twin screw extruder with aspect ratio of 1.46, which is a larger extruder than the ZE-25A used in Examples 1 and 2, is set up to provide a weld formation zone and a weld inversion zone. The weld formation zone is configured to accept polymer resin, plasticizer, surfactant, and a portion of the final water weight. The weld inversion zone is configured with two water injection ports. A third water injection port is located after the weld inversion zone for further dilution of the dispersion. The zone temperatures for the twin screw extruder are 70° C. to 80° C. The water for injection points is preheated to 65° C. to 75° C.

The following components are added to the extruder and passed through the first zone in less than about 10 seconds: 408.2 grams per minute Butvar® B-72 Resin, 205.6 grams/minute castor oil, 83.2 grams per minute Petronate L surfactant (Crompton Corp., Middlebury, Conn.), and 81.6 grams per minute initial water. 75.6 grams per minute are added at the first water injection point, 113.4 grams per minute are added at the second water injection point, and 483.8 grams per minute are added at the third water injection point (for dilution after the weld inversion zone).

The resulting polymer dispersion has the following particle characteristics, as measured with a Horiba LA-910 particle size analyzer:

| Particle Diameter in Microns for Cumulative Length Percent | | | Particle Diameter in Microns for Cumulative Volume Percent | | |
|---|---|---|---|---|---|
| 10% | 50% | 90% | 10% | 50% | 90% |
| 0.218 | 0.361 | 0.570 | 0.321 | 0.592 | 3.173 |

Figure 7:
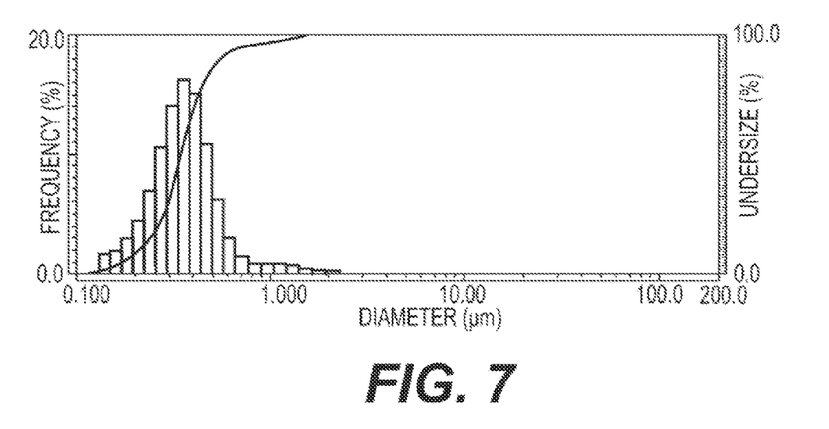
FIG. 7 is a graph showing a particle size distribution for a polymer dispersion.
Figure 8:
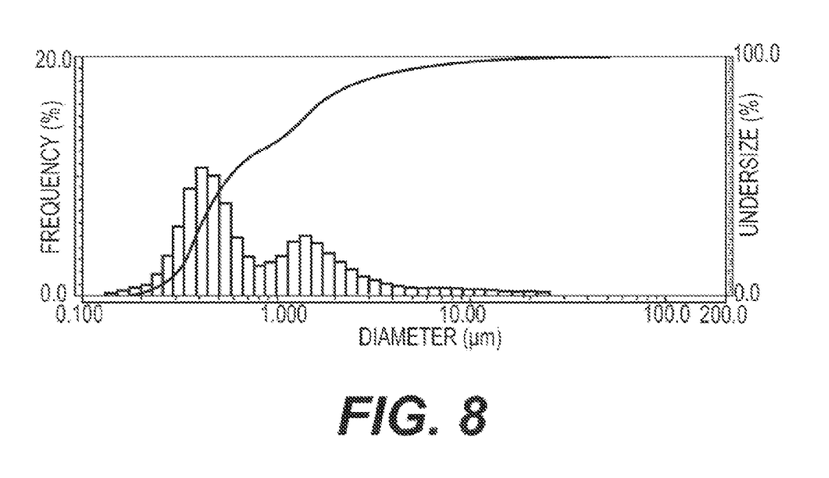
FIG. 8 is a graph showing a particle size distribution for a polymer dispersion.

These results are shown graphically in FIGS. 7 (cumulative length) and 8 (cumulative volume).

The polymer dispersion is sieved through a Number 80 sieve with an opening of 180 microns, and a Mettler Toledo HR 73 Halogen Moisture Analyzer is used to measure the solids contents of rejects and accepts according to the following table:

| Wet Weight (weight percent) | | Solids Content (weight percent) | |
|---|---|---|---|
| Accepts | Rejects | Accepts | Rejects |
| 98.93 | 1.07 | 41.84 | Not Measured |

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer resin can be formed comprising residual hydroxyl content in any of the ranges given in addition to any of the ranges given for plasticizer, where appropriate, to form many permutations that are within the scope of the present invention but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

We claim:

1. A method for producing an emulsion of plasticized poly(vinyl butyral) in water comprising:

feeding into a screw extruder a thermoplastic polymer resin, a plasticizer, a surfactant, and water, wherein said thermoplastic polymer resin is a poly(vinyl butyral) resin having a weight average molecular weight of at least 40,000 Daltons;

mixing said polymer resin, said surfactant, said plasticizer, and said water in a first zone within said screw extruder to form a weld;

moving said weld to a second zone within said screw extruder;

adding water to said weld in said second zone and mixing, thereby causing an inversion in said weld which results in the formation of said emulsion of plasticized poly(vinyl butyral) in water;

wherein said polymer resin, said surfactant, said plasticizer, and said water are moved into and through the first zone, to mix the components and form said weld, in less than about 45 seconds;

wherein said first zone is set at a pressure of $2\times10^6$ Pascal to $4\times10^6$ Pascal and a temperature below 100° C.; and wherein said second zone is set at a pressure of $2\times10^6$ Pascal to $4\times10^6$ Pascal and a temperature below 100° C.

2. The method of claim 1, wherein said screw extruder is a twin screw extruder.

3. The method of claim 1, further comprising:

moving said emulsion of plasticized poly(vinyl butyral) in water to a third zone within said screw extruder; and adding water to said emulsion of plasticized (polyvinyl butyral) in water in said third zone and mixing.

4. The method of claim 1, wherein said second zone is maintained at a temperature between about 70° C. and 90° C.

5. The method of claim 1, wherein said polymer resin, said surfactant, said plasticizer, and said water mix to form said weld in said first zone in less than about 35 seconds.

6. The method of claim 1, wherein said polymer resin, said surfactant, said plasticizer, and said water mix to form said weld in said first zone in less than about 30 seconds.

7. The method of claim 1, wherein said weld inverts into said emulsion of plasticized (polyvinyl butyral) in water in said second zone in less than about 45 seconds.

8. The method of claim 1, wherein said weld inverts into said emulsion of plasticized (polyvinyl butyral) in water in said second zone in less than about 35 seconds.

9. The method of claim 1, wherein said weld inverts into said emulsion of plasticized (polyvinyl butyral) in water in said second zone in less than about 30 seconds.

10. A method for producing an emulsion of plasticized poly(vinyl butyral) in water comprising:

feeding into a screw extruder a thermoplastic polymer resin, a plasticizer, a surfactant, and water, wherein said thermoplastic polymer resin is a poly(vinyl butyral) resin having a weight average molecular weight of at least 40,000 Daltons;

mixing said polymer resin, said surfactant, said plasticizer, and said water in a first zone within said screw extruder to form a weld;

moving said weld to a second zone within said screw extruder;

adding water to said weld in said second zone and mixing, thereby causing an inversion in said weld which results in the formation of said emulsion of plasticized poly(vinyl butyral) in water; and wherein said polymer resin, said surfactant, said plasticizer, and said water are moved into and through the first zone, to mix the components and form said weld, in less than about 45 seconds;

wherein said weld inverts into said emulsion of plasticized poly(vinyl butyral) in water in said second zone in less than about 45 seconds;

wherein said first zone is set at a pressure of $2\times10^6$ Pascal to $4\times10^6$ Pascal and a temperature below 100° C.; and wherein said second zone is set at a pressure of $2\times10^6$ Pascal to $4\times10^6$ Pascal and a temperature below 100° C.

11. The method of claim 10, wherein said second zone is set at a temperature between about 70° C. and 90° C.

12. The method of claim 10, wherein said weld inverts into said emulsion of plasticized (polyvinyl butyral) in water in said second zone in less than about 35 seconds.

13. The method of claim 10, wherein said weld inverts into said emulsion of plasticized (polyvinyl butyral) in water in said second zone in less than about 30 seconds.

14. The method of claim 10, wherein said polymer resin, said surfactant, said plasticizer, and said water mix to form said weld in said first zone in less than about 35 seconds.

15. The method of claim 10, wherein said polymer resin, said surfactant, said plasticizer, and said water mix to form said weld in said first zone in less than about 30 seconds.

* * * * *